Aug. 7, 1962     J. R. FEEMSTER     3,048,109
WING ASSEMBLY
Filed Nov. 12, 1958     3 Sheets-Sheet 1
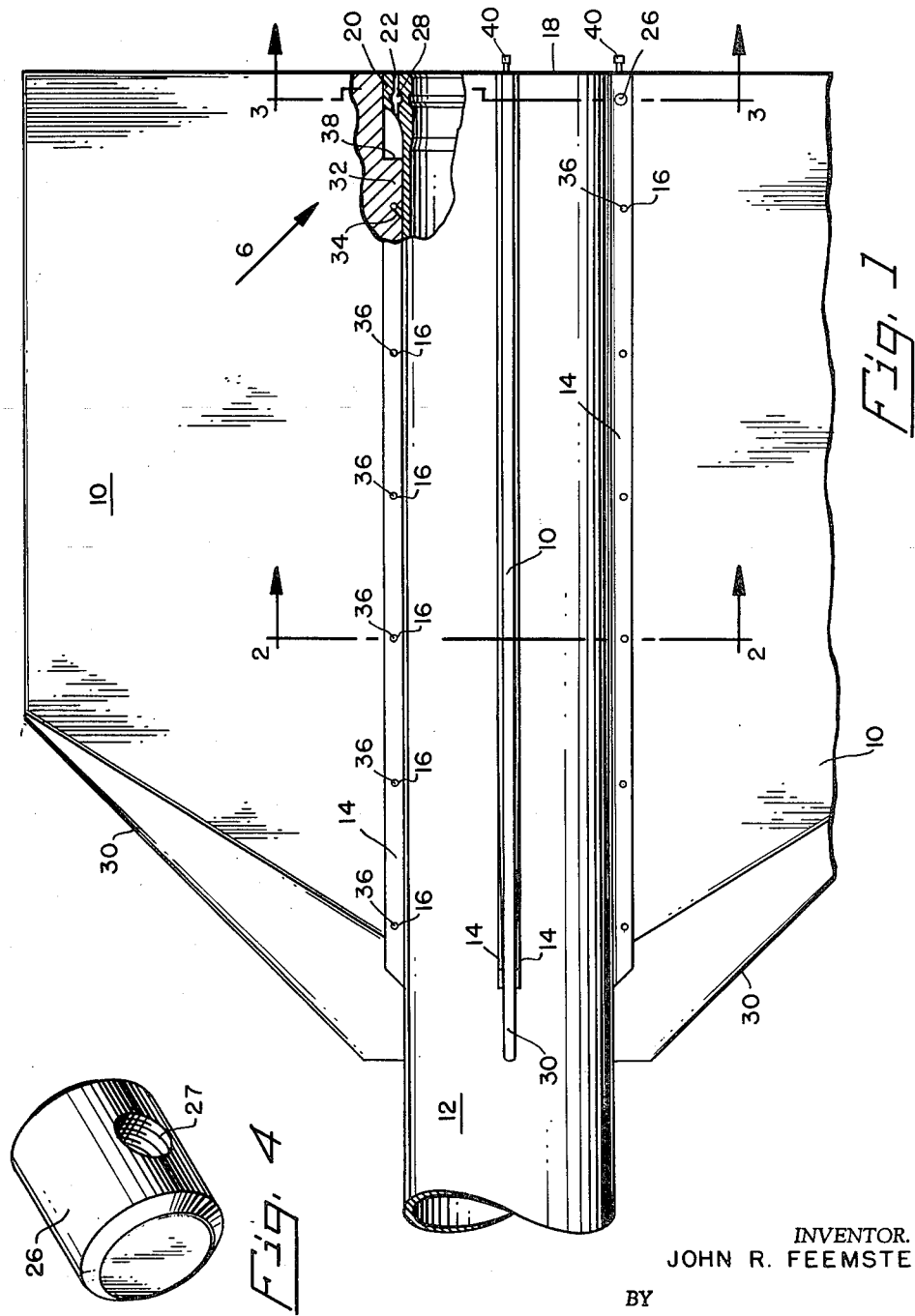
INVENTOR.
JOHN R. FEEMSTER
BY
J. M. St. Amand
ATTORNEYS.

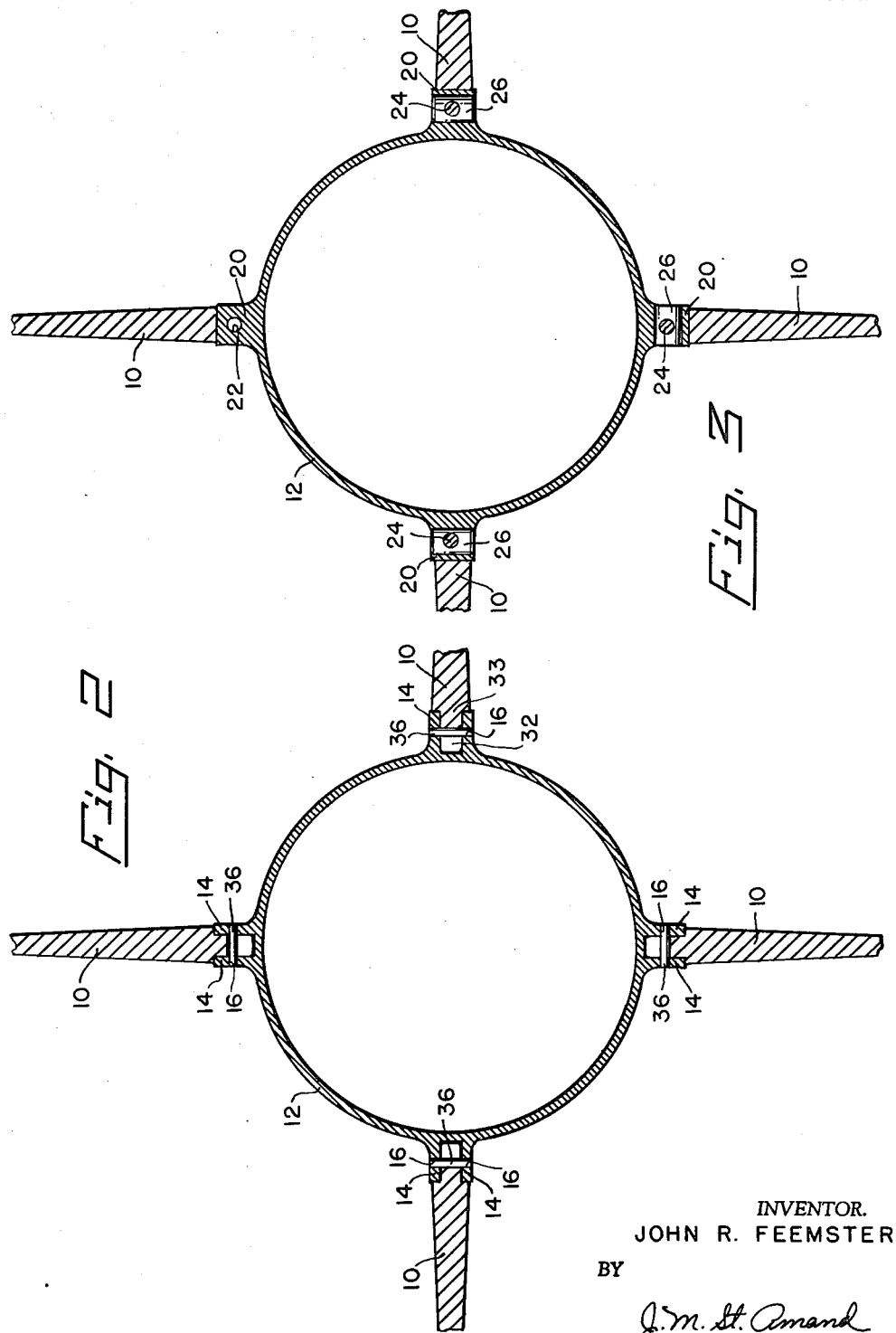

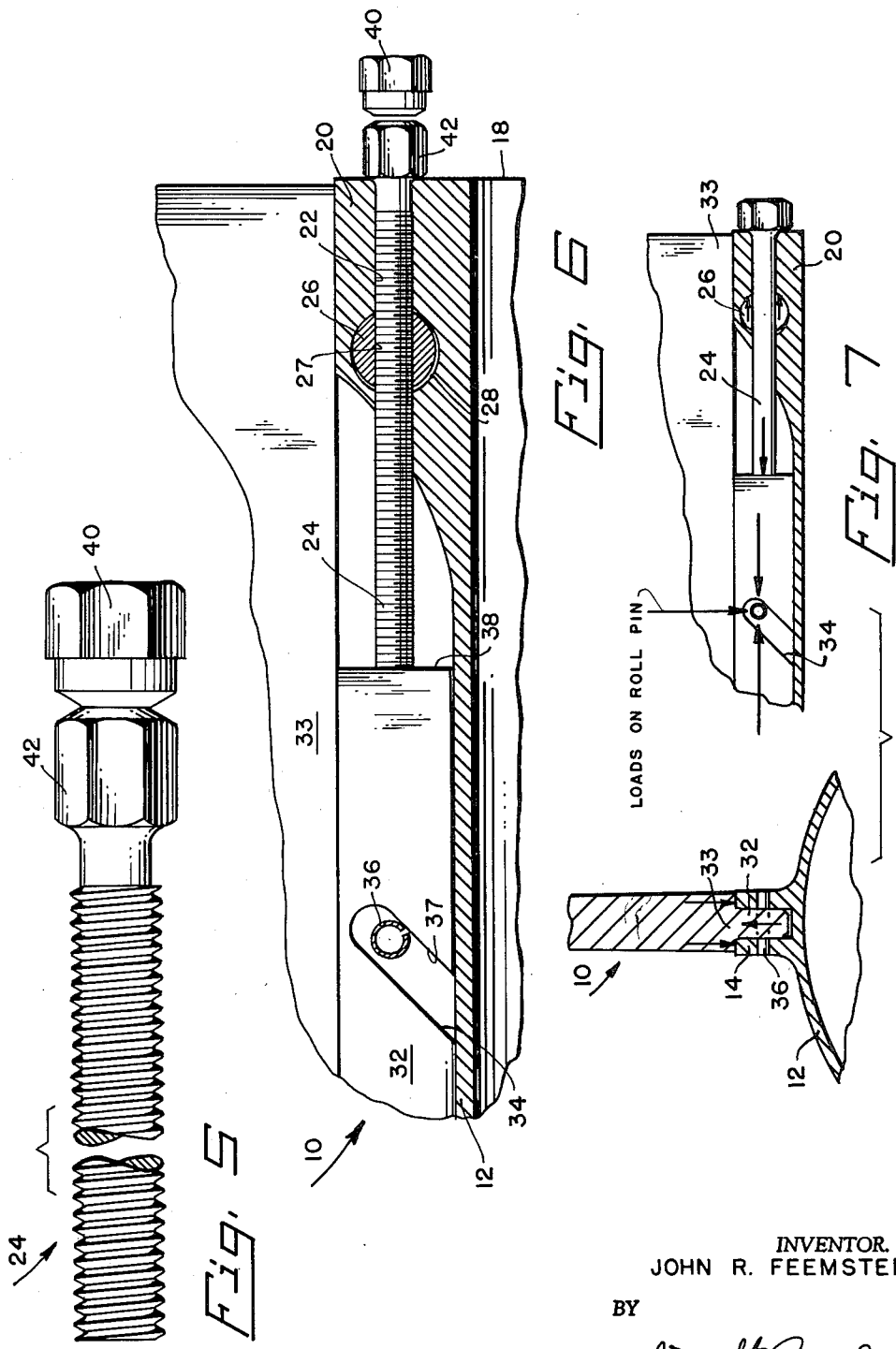

3,048,109
WING ASSEMBLY

John R. Feemster, China Lake, Calif., assignor to the United States of America as represented by the Secretary of the Navy
Filed Nov. 12, 1958, Ser. No. 773,524
5 Claims. (Cl. 102—50)
(Granted under Title 35, U.S. Code (1952), sec. 266)

The invention herein described may be manufactured and used by or for the Government of the United States of America for governmental purposes without the payment of any royalties thereon or therefor.

The present invention relates to wing assemblies for rockets and the like, and more particularly to a wing having maximum wing strength, and which can be assembled rapidly and easily disassembled to conserve space.

Other types of wing assemblies are held in place on rockets or the like by several bolts or rivets which requires excessive time for readiness at time of use or necessitates shipment with the wings already attached in place; these are undesirable features which are overcome by the present invention. The present invention is directed toward the construction of a wing assembly, for rockets and the like, in such a manner that slots in the root of the wing base apply a down force on the wing when a forward force is applied at the aft end of the wing. The downward force is a result of the interaction of the inclined surfaces of slots in the root of the wing base with roll pins in ribs on the rocket motor casing, and the forward force at the aft end of the wing is produced by tightening a single bolt against the wing root.

It is an object of the invention therefore to provide a wing for a rocket or the like having maximum wing strength and which can be rapidly and easily attached thereto.

Another object of the invention is to provide a wing assembly for a rocket or similar vehicle which can be readily and easily disassembled therefrom to conserve space.

A further object of the invention is to provide a fast structural assembly procedure, which may be used for readily attaching a wing to a rocket or the like, using inclined planes and roll pins to form rigid three point contact for strength and rigidity between two structural components, such as between a wing and a rocket body.

A still further object of the invention is to provide a rapidly assemblable high-strength joint for two or more structural members.

Other objects and many of the attendant advantages of this invention will become readily appreciated as the same becomes better understood by reference to the following detailed description when considered in connection with the accompanying drawings wherein:

FIG. 1 is an elevational view of a rocket motor casing having the wing assembly of the present invention mounted thereon by means of the fast structural assembly procedure disclosed herein;

FIG. 2 is a cross-sectional view taken along the line 2—2 of FIG. 1;

FIG. 3 is a cross-sectional view taken along line 3—3 of FIG. 1;

FIG. 4 is a perspective view of a cylindrical nut used in assembling the wing onto the rocket casing;

FIG. 5 is an elevational view of a double headed bolt used in conjunction with the cylindrical nut of FIG. 4;

FIG. 6 is an enlarged detail of the cutaway portion of FIG. 1;

FIG. 7 is a diagrammatic showing of the forces forming a rigid high-strength structural joint.

Referring now to the drawings, like numerals refer to like parts in each of the figures of drawing.

The wing assembly of the present invention consists of a plurality of radial extending wings 10 individually attached to a rocket motor casing 12 or the like. In the drawings is shown an embodiment using four wings, by way of example; however, more or less may be used as desired, and also, other structural components may be fastened together by the same procedure. Rocket motor casing 12, as shown in FIGS. 1 and 2, has four pairs of longitudinal wing support ribs 14 equidistantly spaced about the outside of the cylindrical motor casing. Each pair of ribs 14 has a plurality of pin holes 16 spaced along the length thereof. At the aft end 18 of the motor casing each pair of ribs 14 are joined together forming a solid portion 20, shown in FIGS. 1, 3, and 6. Solid portion 20 has a longitudinal passage 22 therethrough, through which a two-headed pressure bolt 24 passes. A cylindrical nut 26, having a threaded internal passage 27 through which pressure bolt 24 is threaded, is positioned in aperture 28 which passes through solid portion 20 perpendicularly intersecting longitudinal passage 22.

Each of the wings 10 may have a slanted leading edge 30, and have a narrow root portion 32, as shown in FIGS. 1, 2 and 3, beneath wing base 33. Root 32 has a plurality of slots 34 spaced along the length thereof. Slots 34 are slanted at an angle, of 45° for example, their surfaces forming inclined planes extending in a rearward direction. These slots 34 on each of the wings fit about roll pins 36 which are carried by pairs of pin holes 16 in each pair of ribs 14. Roll pins 36 in their preferred embodiment, and as illustrated in FIG. 6, are made from spring steel rolled into a small cylinder and used as a pin or cross-member between ribs 14. However, solid metal pins may be used if suitable. Pressure bolt 24 is threaded through aperture 27 in cylinder nut 26 and bears against the aft end 38 of root 32 on the wing base pushing the wing forward with a force which tends to force pins 36 against rearward surface 37 and toward the bottom end of their respective slots 34.

The operation of slots 34 at the root of wing 10 are such as to apply a down force on the wing when a forward force is applied at the aft end of the wing. The downward force is a result of the interaction of the inclined surfaces of slots 34 with roll pins 36 in the motor casing ribs 14. The forward force at the aft end of wing 10 is produced by tightening two-headed pressure bolt 24 against the aft end 38 of the wing root 32. Rigidity is maintained by the surface contact between the motor casing wing support ribs 14 and the wider base portion 33 just above the wing root 32 in addition to that with the roll pins 36 thus forming a rigid three point contact along the entire length of wing base. The roll pins 36 in the ribs yield sufficiently to allow all the wing slots 34 to assume some of the load transmitted from pressure bolt 24. The strength achieved by this fastening system is illustrated by the diagrammatic views of FIG. 7 showing the triangulation of forces. The resultant forces are developed from the force of the pressure bolt through the wing onto the inclined plane (surface 37 of slots 34). Since the force of pressure bolt 24 is high, the triangulation forces are more than adequate to prevent movement of the wing base. The forces, though higher than normally associated with a wing attachment, are contained in the wing and wing support ribs, and are such that no forces are transmitted to other portions of the rocket motor casing or attaching structure. This allows firm attachment without adding stresses to additional associated structure. Bolt 24 is two-headed to allow torque control without the use of torque wrenches. First head 40 on bolt 24 is designed to shear off when the proper torque is attained. The second bolt head 42 permits disassembly of the wing if necessary. Reassembly requires only that a new two-headed bolt 24 be used to acquire proper assembly strength. Should a bolt become broken off beyond the second head, cylindrical nut 26 can be punched out shearing pressure bolt 24 and thereby freeing the wing. Again a new two-headed bolt together with a new cylindrical nut allows proper reassembly.

The present wing can be assembled onto a rocket casing very rapidly, which is very important especially under combat conditions; it is quite rigid when assembled, and can be disassembled to conserve space. The use of inclined plane slots and roll pins to form rigid three point contact permits new possibilities for fast assembly procedures of external or internal structures of this nature. This principle can be applied to other structural components wherever speed in assembly is necessary.

Obviously many modifications and variations of the present invention are possible in the light of the above teachings. It is therefore to be understood that within the scope of the appended claims the invention may be practiced otherwise than as specifically described.

What is claimed is:

1. In combination, a rocket motor casing and a readily-attachable wing structure, said casing having a pair of longitudinally extending parallel ribs defining a groove therebetween, a plurality of cross-members between said parallel ribs rigidly attached thereto and intermittently spaced along the length thereof, a solid wing member having leading and trailing edges and a base having a root portion rigid therewith, the width of said root portion being substantially equal to the space between said pair of parallel ribs, said root portion having a plurality of rearwardly extending slanting slots intermittently spaced along the bottom thereof, the entire length of each of said slots being straight, the spacing of said slanting slots corresponding to the spacing of said cross-members along the length of said pair of parallel ribs, said slots operable to fit about said cross-members, the slotted root portion of said wing member being positioned within the groove between said pair of parallel ribs with said rearwardly slanting slots fitting about said cross-members, the rearward end of said pair of parallel ribs being provided with means for exerting a predetermined forward force on the root portion of said wing member operable to push said wing member slightly forward and tend to force said cross-members into and against the rear surface of their respective slots for firmly attaching said wing structure to said rocket motor casing without adding stress thereto, said last-named means comprising a nut positioned in cross-wise apertures formed through the rearward ends of said ribs and a bolt threaded through said nuts, said bolt having an end thereof disposed in said groove and in engagement with said root portion.

2. A structure as in claim 1 where said apertures and nut are cylindrically shaped, and said nut is operable to be punched out of said apertures shearing said pressure bolt for emergency removal thereof.

3. A structure as in claim 1 wherein said pressure bolt has two heads, the first of said heads being operable to shear off when a predetermined amount of torque is applied, the second of said heads being used for removal of the bolt when desired.

4. A readily-attachable high strength joint structure for rigidly attaching two structural members, said joint structure comprising a first structural member formed with a pair of spaced longitudinally extending parallel walls defining a groove, a plurality of cross-members disposed at spaced intervals in said groove transverse thereof and having ends fixed to said walls, a second structural member including an elongated base having a root portion rigid therewith, said root portion being of a width substantially equal to the width of the spacing of said walls and formed with a plurality of spaced slots in the lower portions thereof, each of said slots having a straight inclined wall at one side thereof, the spacing of said slots corresponding to the spacing of said cross-members, said root portion being received in said groove with said slot walls disposed adjacent said cross-members respectively, and means carried by said first structural member at one end of said groove in contact with said root portion and operable to push the root portion in one direction with predetermined force for forcing each of said slot walls against its respective cross-member and holding the root portion tightly in said groove, said last-named means comprising a cylindrical nut disposed in an aperture formed in said first structural member and a bolt threaded through the nut, said bolt having one end thereof disposed in said groove and in engagement with one end of said root portion.

5. The joint structure as in claim 4 wherein said bolt is formed at the other end thereof with two heads, the first of said heads being operable to shear off when a predetermined amount of torque is applied thereto in tightening said bolt against said root portion, and the second of said heads being operable to loosen said bolt and remove the same.

References Cited in the file of this patent

UNITED STATES PATENTS

| | | |
|---|---|---|
| 281,964 | Brent | July 24, 1883 |
| 843,456 | Higbee et al. | Feb. 5, 1907 |
| 1,276,892 | Fender | Aug. 27, 1918 |
| 2,261,820 | Zimtbaum | Nov. 4, 1941 |
| 2,485,870 | Edson | Oct. 25, 1949 |
| 2,522,934 | Engnell et al. | Sept. 19, 1950 |
| 2,660,271 | Hupp | Nov. 24, 1953 |
| 2,689,698 | Agnew | Sept. 21, 1954 |
| 2,775,202 | Crockett | Dec. 25, 1956 |
| 2,782,884 | Roessler | Feb. 26, 1957 |
| 2,789,457 | Allen | Apr. 23, 1957 |
| 2,842,058 | Kuller et al. | July 8, 1958 |
| 2,850,934 | Sehn | Sept. 9, 1958 |

FOREIGN PATENTS

| | | |
|---|---|---|
| 412,312 | Germany | Apr. 20, 1925 |
| 689,995 | Great Britain | Apr. 8, 1953 |